United States Patent Office.

WILLIAM A. CLEVELAND, OF WATERVILLE, NEW YORK.

Letters Patent No. 69,970, dated October 22, 1867.

---

IMPROVED MEDICAL COMPOUND FOR THE CURE OF RING-BONE, SPAVIN, SPLINT, &c., IN HORSES.

---

The Schedule referred to in these Letters Patent and making part of the same.

---

TO ALL WHOM IT MAY CONCERN:

Be it known that I, WILLIAM A. CLEVELAND, of Waterville, in the county of Oneida, and State of New York, have invented a new Compound Medicine for the Cure of Ring-Bone, Spavin, Splint, and other osseous diseases and injuries of the limbs of horses and other animals; and I do hereby declare that the following is a full, clear, and exact description thereof, and of the manner of compounding and applying the same.

I make a sand-bath, by filling a vessel half full of sand, and set it on a hot stove or other suitable place to heat. I then set into this sand-bath a small vessel, holding half a pint, immersing the same two-thirds of its height in the sand. I then raise the heat of the sand-bath to eighty-six or ninety degrees Fahrenheit. I then pour into this small vessel two ounces of alcohol. Then add forty grains of iodine; then twenty grains of bichloride of mercury, stirring the mixture well. Then tie over the top of the vessel a covering of paper, and let it stand twenty-four hours, keeping up the same degree of heat as before mentioned. Then breaking a hole in the paper covering, drop into the mixture thirty drops of Croton oil, and stir the mixture well. Then covering the hole in the paper cover, let it again stand twenty-four hours, still maintaining the same degree of heat as before. After this let the mixture cool, and then bottle it up in a bottle well stopped with a ground stopper. This mixture I have named "Bony."

The above is an example as to the relative quantities of materials used; of course any larger or smaller quantity of the mixture may be made, by observing the same relative proportions of the above component parts.

The mixture called the "bony" is to be used in the preparation of the medicine actually applied for the purpose of the cure, as I shall now describe.

I put into an earthen jar eight ounces of quicksilver; to this I add four ounces of nitric acid, stirring the same slowly for one minute. Then add four drachms cantharides, and stir well. Then add four ounces sulphuric acid, pouring in slow, and stir. After five minutes add of the above mixture which I have called "bony," twenty-six to thirty drops. Then stir well, and repeat the stirring every half hour, for five hours. Then add four ounces of prepared chalk well stirred in. Then after standing four hours the preparation is ready for use.

The medicine is applied to the part affected by first removing the hair and then rubbing on the mixture, by means of a swab, sponge, stick, or other means, twice each day until the callus is two-thirds removed. Then omit the application altogether, and the remaining portion will soon disappear.

Having thus described my medicine, and the manner of compounding and using the same, what I claim as my invention, and desire to secure by Letters Patent, is—

The medical compound above described, to be compounded and prepared substantially as described, and for the purposes described.

WM. A. CLEVELAND.

Witnesses:
  WM. BAKER,
  GEO. L. STEELE.